May 3, 1955

H. G. MARVIN 2,707,424

ATTACHMENT FOR TRACTOR DRAWN PLOW

Filed March 28, 1950

INVENTOR.
HENRY G. MARVIN,
BY Lloyd P. Shank
ATTORNEY

United States Patent Office 2,707,424
Patented May 3, 1955

2,707,424

ATTACHMENT FOR TRACTOR DRAWN PLOW

Henry G. Marvin, Guilford, N. Y.

Application March 28, 1950, Serial No. 152,295

1 Claim. (Cl. 97—47.65)

The present invention relates to a device for use in association with the draw bar of a tractor to prevent downhill swinging movement of a plow when such a cultivating implement is elevated above the soil.

The front end portion of a plow beam is usually hitched to the tractor forwardly of the draw bar and substantially at the center portion of the tractor. The hitch is such that the plow beam may swing in a vertical plane to permit raising and lowering of the plow. In carrying out a plowing operation and in the event that the plow share strikes a stone or rock the moldboard and the landside parts of the plow often jump out of the soil being plowed. If such inadvertent elevation of the plow share takes place when the plowing along a hillside, the plow beam is free to shift downhill by gravity. Under these circumstances, the beam in swinging downwardly comes to rest on a part of the draw bar structure. It is then necessary to stop the tractor and back up in order to free the plow beam from the draw bar structure. Accordingly plowing along a hillside often requires frequent stops and backing of the tractor to re-position the plow for further cultivating operations.

An object of the present invention is to provide an attachment for the draw bar of a tractor provided with an upstanding arm which is adapted to be engaged by the beam of the plow in the elevated position for preventing lateral shifting of the plow beam.

A more detailed object of the invention resides in replacing the beam guide plate of the tractor draw bar with a generally L-shaped member having a horizontal portion serving as a beam guide plate strap and a more vertical portion providing a guide preventing downhill swinging of the plow beam in the event that the plow jumps from or is lifted from the ground in a hillside position of the tractor and plow.

Other objects and features of the invention will be more apparent as the present disclosure proceeds and upon consideration of the accompanying drawing and the following detailed description wherein an exemplary embodiment of the invention is disclosed.

Figure 2:
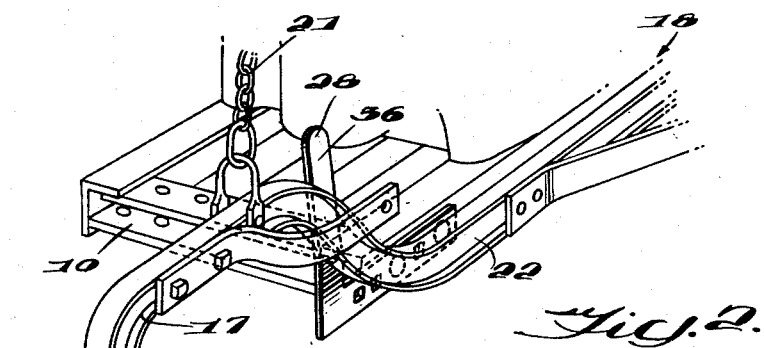
Fig. 2 is a fragmentary perspective view showing a plow beam associated with the guide attachment.
Figure 3:
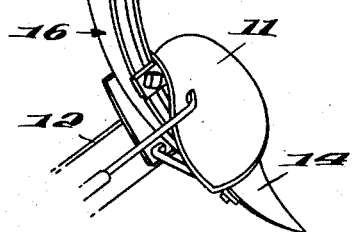
Fig. 3 is a fragmentary end elevational view showing the rear end portion of a tractor draw bar with the plow beam guide mounted thereon.

The invention is directed to an attachment for preventing downhill swinging of a plow and one conventional type of draw bar 10 is provided at the rear end of the tractor (not shown). The essential elements of a plow are shown in Fig. 2 including a moldboard 11, a landside 12 and a plow share 14. The plow assembly is of a conventional design and is carried by the lower end of a hook-shaped plow beam 16. The plow beam includes an arched portion 17. The front straighter portion 22 of the plow beam extends forwardly beyond the draw bar 10 and is hitched to the tractor structure in advance of the point 18. The plow beam hitch (not shown) is such that the beam may be elevated by a lift chain, such as illustrated at 21. The forward portion 22 of the plow beam is arranged along the side of the tractor and when the plow is lowered and in the plowing position the arched portion 17 lies generally in the horizontal plane of the draw bar structure 10.

Figure 1:
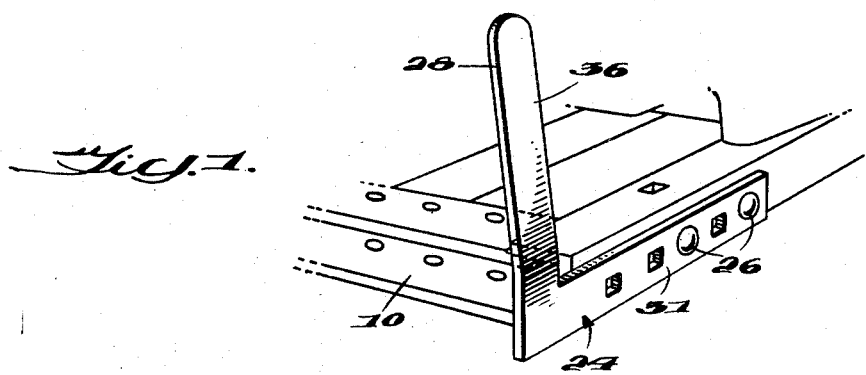
Fig. 1 is a fragmentary perspective view of the draw bar of a tractor showing an attachment exhibiting the invention affixed thereto.

In carrying out the invention an arm 28 is disposed in a substantially vertical position as shown in Figs. 1 and 2, to provide an abutment to limit lateral shifting of the plow beam 16 when the plow jumps from the ground during a hillside plowing operation. The arm 28 may be formed integral with a guide plate strap portion 31 to provide an L-shaped member as will be apparent from a consideration of Fig. 1. The horizontal portion 31 serves the purpose of a conventional beam guide plate strap and provides means for supporting the generally vertically disposed arm 28. The conventional beam guide strap usually terminates at 24 and it will be noted that the arm 28 projects upwardly at right angles from the strap portion 31. The horizontal portion of the attachment may be rigidly secured to the side of the draw bar structure 10 by bolts 26.

The attachment may be formed of suitable metal and the lateral face 36 is preferably inclined with respect to a vertical plane. In the embodiment illustrated the face 36 of the arm 28 is positioned at an angle of about eighty-five degrees with respect to the horizontal. Thus when the arched portion 17 of the plow beam shifts laterally it will engage the arm 28 near the top thereof. The angular disposition of the face 36 will guide the plow beam to the right in Fig. 2 as the plow structure moves downwardly. Accordingly the plow is free to return to a cultivating position even when the equipment is used in plowing along inclined ground.

The attachment in operation has been found to arrest downhill shifting of the plow beam when the plow jumps out of the ground in cultivating along the side of a hill. The plow returns to its proper position so that the plow share 14 reenters the soil and the plowing operation may be continued without the necessity of stopping and backing the tractor. It will be understood that a guide arm similar to that shown at 28 may be mounted at the other side of the draw bar structure 10 so as to cooperate with the second plow beam in a two-way plow hitch. It will be appreciated that the embodiment described may be altered in other respects and particularly with regard to the shape and structure of the attachment. Such modifications and others may be made without departing from the spirit and scope of the invention as set forth in the appended claim.

What I claim and desire to secure by Letters Patent is:

A draw bar structure for a tractor for preventing lateral shifting of a plow beam connected to the tractor forwardly of the draw bar comprising, a flat elongated rectangular shaped-plate member arranged along one side of the draw bar, means for securing said plate member to said side of the draw bar and maintaining the plate member in a substantially horizontal position, an arm extending upwardly from a rear end of said plate member substantially at right angles thereto and adjacent the rear end of the draw bar, said arm having a guide face arranged in substantially the same plane as the outer face of the plate member adjacent the lower end of said arm, and said guide face above the plate member being straight and in one plane diverging from the outer face of the plate member in proceeding upwardly at an angle of approximately five degrees.

References Cited in the file of this patent

UNITED STATES PATENTS

| | | |
|---|---|---|
| 663,744 | Felter | Dec. 11, 1900 |
| 1,301,744 | Reynolds | Apr. 22, 1919 |
| 1,377,050 | Altgelt | May 3, 1921 |
| 1,397,748 | Towner | Nov. 22, 1921 |
| 1,871,097 | Trigwell et al. | Aug. 9, 1932 |
| 1,912,039 | Madill | May 30, 1933 |
| 2,137,829 | Austin | Nov. 22, 1938 |
| 2,243,306 | Ashton | May 27, 1941 |
| 2,339,830 | Zink et al. | Jan. 25, 1944 |
| 2,372,403 | Swanson | Mar. 27, 1945 |
| 2,577,002 | Carl, Jr. | Dec. 4, 1951 |